March 11, 1958     B. L. DAUGHERTY     2,826,326

SERVICE BOX CLOSURE

Filed Feb. 20, 1956

INVENTOR
BRUCE L. DAUGHERTY

BY    W. E. Sherwood

ATTORNEY

United States Patent Office 2,826,326
Patented Mar. 11, 1958

2,826,326

SERVICE BOX CLOSURE

Bruce L. Daugherty, Georgetown, Ky.

Application February 20, 1956, Serial No. 566,633

4 Claims. (Cl. 220—25)

This invention relates to an improved apparatus for securely closing the open ends of pipes, conduits and the like, and is particularly adapted for use in connection with service boxes employed by various utility companies, such as water and gas distributing companies. As is known, the conventional service, or curb, box is mounted externally of the building being served and is provided with an access pipe into which various devices may be inserted in order to turn valves, read meters, sample gas leakage and serve other purposes. Such access pipes frequently terminate at or near the surface of the ground, sidewalk or curb and customarily are encased in concrete. Although the closure for such pipes is required to be periodically removed during these inspection srevices, it should, nevertheless, be substantially tamper-proof by unauthorized persons.

Experience has shown that the mounting arrangement by which the conventional cover is attached to the access pipe is often subjected to excessive stresses; as when the cover is being adjusted during an inspection, or by vehicles striking the cover or by vibration; and that the means attaching the cover to the pipe often fails under such stresses. Heretofore, it has been the practice, when the attaching means is broken, to replace the original cover by a new cover having an internally expanding pipe engaging mechanism or equivalent device, since it is prohibitively expensive to dig the access pipe out of the concrete and to replace the pipe. A conventional form of such a replacement cover is exemplified by Mueller Patent 923,066.

The present invention has as a chief object the provision of a simple and inexpensive adapter for joining the cover to the access pipe when the original attaching means is inadequate. A second object is to provide an adapter for joining the cover to the access pipe in conjunction with an adequate original attaching means.

A third object is to provide a new and improved service box closure apparatus insuring suitable ventilation for the service box and serving to intercept foreign material dropping into the service box.

Other objects and advantages will become more apparent when the following description is considered in conjunction with the accompanying drawings, in which.

Figure 1:
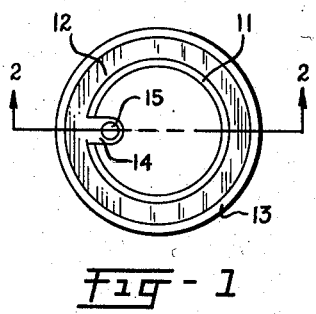
Fig. 1 is a top plan view of the conventional access pipe or member.
Figure 2:
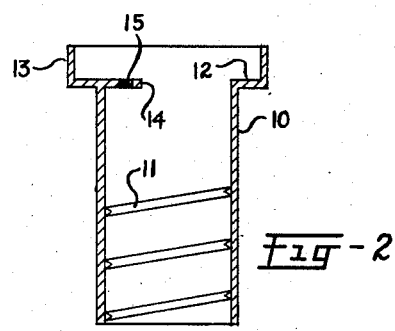
Fig. 2 is a sectional view along line 2—2 of Fig. 1.

As shown in Figs. 1 and 2 a conventional form of service box access pipe comprises a tubular member 10 having interior helical threads 11 which engage with similar threads on the exterior of a companion tubular member, not shown, extending toward the service box enclosed apparatus, as for example, a shut-off valve. Adjacent its end the member 10 is provided with an interior ledge 12 terminating in an enlarged diameter rim 13 upon which a closure is adapted to rest. Adjacent the ledge, an abutment 14 having a threaded aperture 15 therein is provided, such abutment being eccentrically disposed with respect to the axis of the access pipe in order to provide suitable clearance for tools which may be inserted in the pipe.

While the thus described pipe may be formed of any suitable structural material, it frequently is made of cast iron. Accordingly, over a period of time the abutment material may crystallize under repeated stresses and break off in a jagged configuration, one example being shown in Fig. 8.

Figure 3:
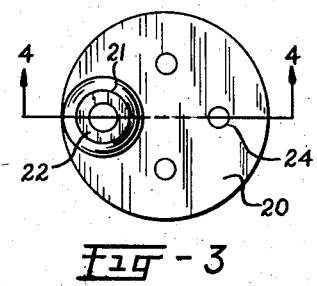
Fig. 3 is a top plan view of the conventional cover for the pipe shown in Figs. 1 and 2.
Figure 4:
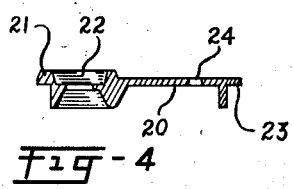
Fig. 4 is a sectional view taken along line 4—4 of Fig. 3.

Referring to Figs. 3 and 4, a cover member 20 having boss 21 with a recess 22 therein is provided for closing the end of the access pipe. The recessed boss is adapted to receive a bolt, by means of which the cover can be securely fixed to the abutment 14. Usually a special tool is required to fasten or unfasten the cover thereby making it more difficult for unauthorized persons to tamper with the installation. The cover, moreover, is provided with a ledge 23 which seats upon the top of rim 13 of the access pipe and in order to make a tight closure the inspector frequently places heavy pressure upon the connecting bolt in order to draw the cover tightly upon that rim. For purposes of ventilation, one or more apertures 24 of suitable size and location may be provided in the cover, particularly when used with gas service boxes.

Figure 5:
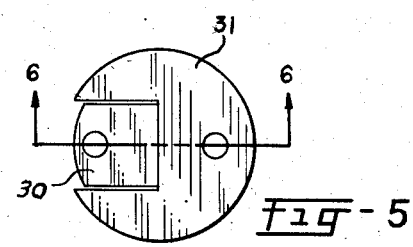
Fig. 5 is a top plan view of one form of adapter.
Figure 6:
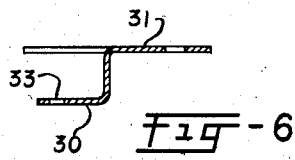
Fig. 6 is a sectional view taken along line 6—6 of Fig. 5.

With the foregoing explanation in mind, reference now is made to Figs. 5 and 6 showing one form of adapter suitable for use in the practice of my invention. A plate of strong material, fabricated for example from a ⅛ inch common steel sheet, may be formed with an integral depending hook-like means 30 lying in a plane appropriate to engage the underside of the abutment 14 and with the main portion of the plate 31 lying in a plane appropriate to rest upon ledge 12. In order to insure a ready fit of the adapter into position, the distance from the geometric center of the adapter to the outermost periphery of the hook-like portion is less than the distance from that center to the outermost periphery of the plate portion 31.

Figure 7:
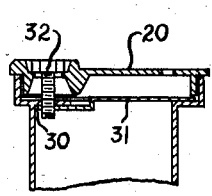
Fig. 7 is a sectional view of the assembly employing the adapter of Figs. 5 and 6.
Figure 8:
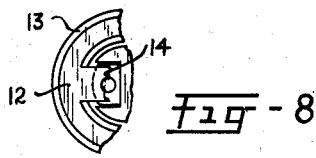
Fig. 8 is a broken away plan view showing an adapter in place upon an access pipe having a broken attaching means, the cover being removed.

The hook-like portion contains a threaded aperture 33 for engagement with threaded bolt 32 (Fig. 7) extending from the recessed boss in cover 20. Accordingly, as bolt 32 is turned, the hook-like portion is pulled upwardly under abutment 14 regardless of whether the bolt is or is not engaging with the threaded aperture 15 originally provided in the access pipe abutment. At the same time, cover 20 is drawn downwardly with its lower peripheral surface pressing upon the top of plate 31 at its maximum periphery and thus forcing that plate upon ledge 12. In this manner the adapter may be employed to secure a tight fit of the cover upon a broken abutment 14, as seen in Fig. 8 or upon a normal abutment, as in Fig. 2. Furthermore, by use of the adapter of my invention, access pipes having abutments of suitable shape devoid of the threaded aperture 15 may now be employed, thus saving the extra operations of forming and threading the aperture during manufacture of such pipes.

As the hook-like portion of the adapter is drawn upwardly by the bolt, the plate 31 is subjected to stress tending to pull portions of its periphery downwardly into engagement with ledge 12 regardless of the pressure exerted by the cover 20 superimposed thereon. It will be understood that a small relative spring-like motion occurs between the hook-like portion and the plate to which it is attached as the bolt 32 is tightened. Many configurations of adapters may be used without departing from the invention, but to avoid tipping or deformation of the plate by bending, I employ a plate configuration which has some portion of its periphery in contact with ledge 12 on each side of a diameter extending through the threaded aperture 33 and also has some portion of its periphery in contact with that ledge on each side of a diameter normal to the first-mentioned diameter. In other words, my invention comprehends that the adapter, in its preferred form, will have some portion of its periphery in each of the four quadrants in contact with the ledge.

Figure 10:
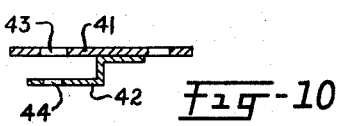
Fig. 10 is a sectional view taken along line 10—10 of Fig. 9.
Figure 9:
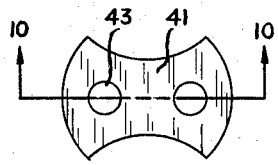
Fig. 9 is a top plan view of a second form of adapter.

Figs. 9 and 10 show one variation of adapter shape in which an upper plate 41 is provided with a separate hook-like member 42 suitably affixed to the upper plate as by welding or the like. The upper plate in this instance contains an aperture 43 of somewhat larger size than the threaded aperture 44 in the hook-like member and disposed on the same axis therewith.

In each form of adapter, adequate communication between the interior of the service box and the aperture cover is provided to insure ventilation when this is required, as in gas service boxes. However, the invention also comprehends the use at times of a completely or partially imperforate adapter (apart from the necessary bolt holes) designed to prevent insertion of foreign objects or sifting of sand or the like into the interior of the access pipe, should this be desired, as for example in water company service boxes.

The adapter may be formed from any metal or other material of suitable mechanical strength and thickness and is in no way intended to be limited to the particular example given above.

While this invention has been described by reference to particular embodiments thereof, it is to be understood that numerous modifications may be made by those skilled in the art without actually departing from the invention. It is, therefore, the purpose of the appended claims to cover all such equivalent variations as come within the true spirit and scope of the foregoing disclosure.

What I claim and desire to secure by Letters Patent of the United States is:

1. For use in a service box; a tubular member positioned to receive a tool into said box and with an annular outwardly facing ledge adjacent its outer end and an interior abutment on its side adjacent said ledge, an adapter having one or more arcuate edge portions lying in a first plane and engaging with the upper surface of said annular ledge and a depending hook-like portion lying in a second plane and engaging beneath said abutment said hook-like portion having a threaded aperture therein, a removable cover resting upon said tubular member above said ledge and having an aperture disposed above said threaded aperture, and a threaded bolt passing through said apertures for clamping said adapter and cover together in order to form a closure for said box and whereby force exerted on said bolt to pull said cover against said member simultaneously serves to anchor said hook-like portion beneath said abutment.

2. Apparatus as defined in claim 1 wherein said bolt is disposed at one side of said adapter and said adapter has an arcuate edge portion for engagement with said ledge at a point diametrically opposite said bolt.

3. For use in a service box; a tubular cylindrical member positioned to receive a tool into said box and with an annular outwardly facing ledge adjacent its outer end and an interior abutment on its side adjacent said ledge; an adapter having edge portions lying into a first plane and engaging with the upper surface of said annular ledge and a depending hook-like portion lying in a second plane and engaging beneath said abutment and with a threaded aperture therein, a removable cover resting upon said tubular member above said ledge and with an aperture therein disposed above said threaded aperture, and a bolt extending through said apertures for fastening said adapter and cover to said tubular member, said adapter having a part of its edge portions lying in said first plane in engagement with said ledge and arranged on each side of a diameter of said adapter extending through the aperture in said hook-like portion thereof.

4. Apparatus as defined in claim 3, wherein said adapter has a part of its edge portions lying in said first plane in engagement with said ledge and arranged in each quadrant formed by the intersection of a diameter extending through said aperture in said hook-like portion and a diameter normal to said first-mentioned diameter, thereby to obviate tipping of said adapter.

References Cited in the file of this patent

UNITED STATES PATENTS

| | | |
|---|---|---|
| 1,027,397 | Adam | May 28, 1912 |
| 1,774,141 | Hills | Aug. 26, 1930 |
| 2,569,914 | Appleton | Oct. 2, 1951 |
| 2,706,127 | Stieglitz | Apr. 12, 1955 |
| 2,712,952 | Lundgren | July 12, 1955 |